United States Patent [19]

Hanlon

[11] Patent Number: 4,800,651

[45] Date of Patent: Jan. 31, 1989

[54] VEHICLE ALIGNMENT SYSTEM

[75] Inventor: William C. Hanlon, Medina, Ohio

[73] Assignee: The Firestone Tire & Rubber Company, Akron, Ohio

[21] Appl. No.: 503,956

[22] Filed: Jun. 13, 1983

[51] Int. Cl.⁴ .............................. G01B 5/255
[52] U.S. Cl. .................. 33/203.18; 33/203.15; 33/193; 33/180 AT; 33/288; 33/600
[58] Field of Search .......... 33/203.18, 203.19, 203.15, 33/203.16, 185 V, 181 AT, 180 AT, 203, 288, 335, 193, 533

[56] References Cited

U.S. PATENT DOCUMENTS

| | | | |
|---|---|---|---|
| 1,653,249 | 12/1927 | Bennett | 33/193 |
| 2,798,296 | 7/1957 | Liskey | 33/288 |
| 2,877,560 | 3/1959 | Brown et al. | 33/193 |
| 4,159,574 | 7/1979 | Samuelsson | 33/193 |
| 4,285,136 | 8/1981 | Ragan | 33/203.18 |

FOREIGN PATENT DOCUMENTS 2025064  1/1980  United Kingdom ............ 33/203.18

OTHER PUBLICATIONS

MTD—Jun. 1982, vol. 63, No. 7—p. 44, "Sun/Norton Introduces Truck Alignment System".
MTD—Jul. 1981, vol. 62, No. 8—p. 6.
MTD—Jun. 1981, vol. 62, No. 7—p. 52.

Primary Examiner—Willis Little
Attorney, Agent, or Firm—Ronald Brietkrenz

[57] ABSTRACT

An apparatus and method for aligning axles with respect to the frame of a vehicle and for determining wheel camber thereof.

6 Claims, 5 Drawing Sheets

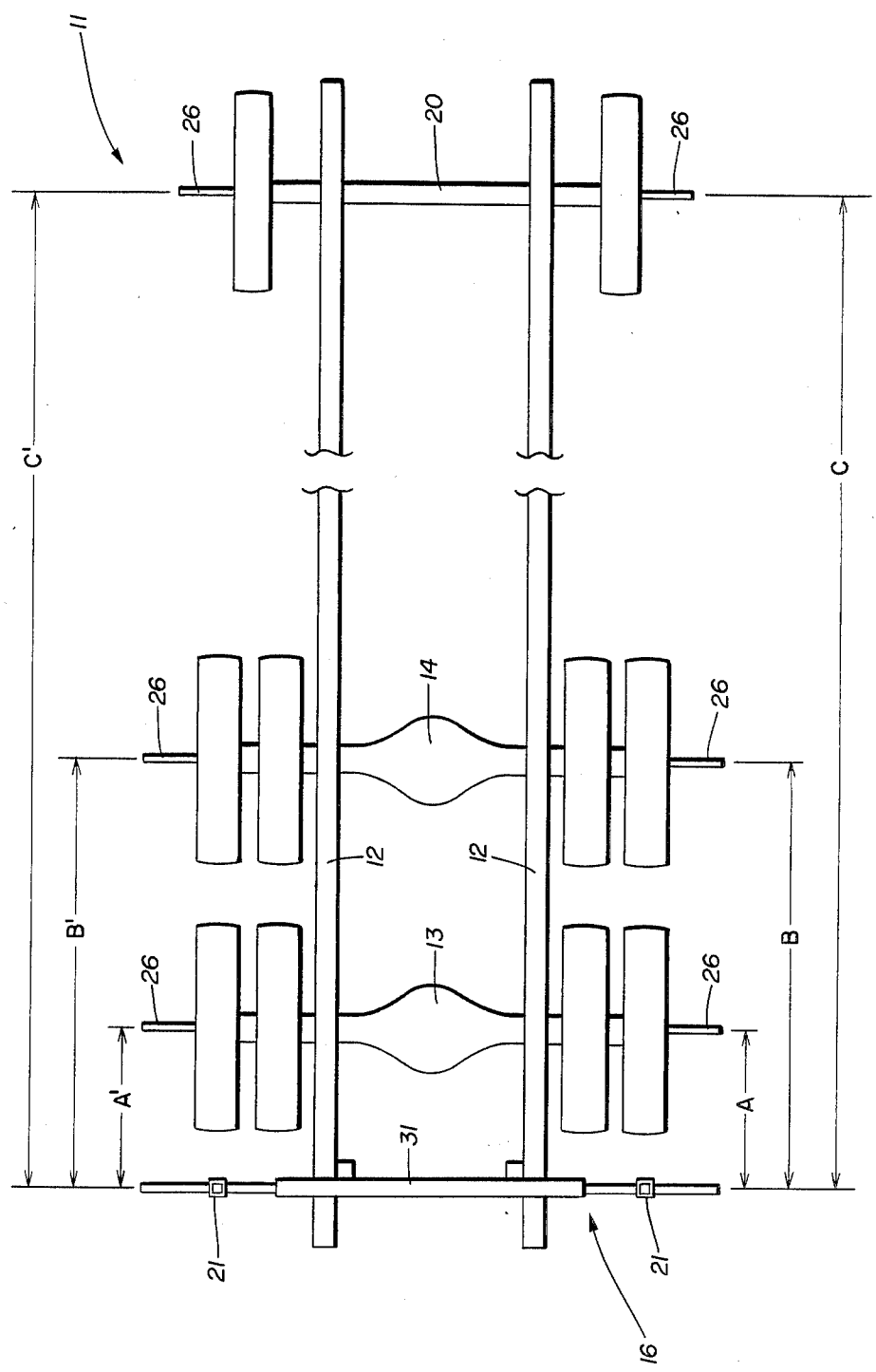

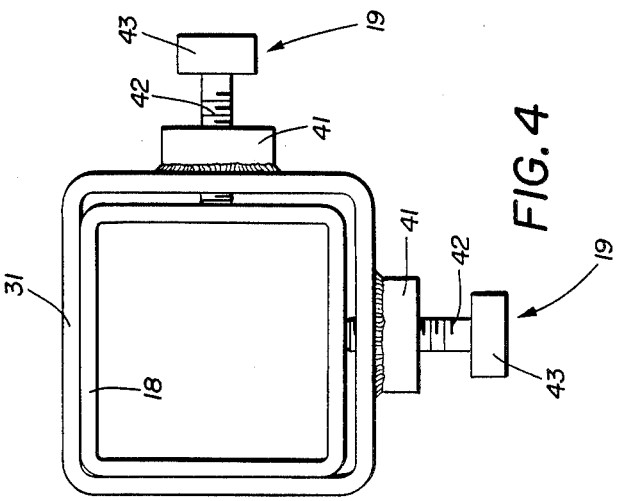
FIG. 4
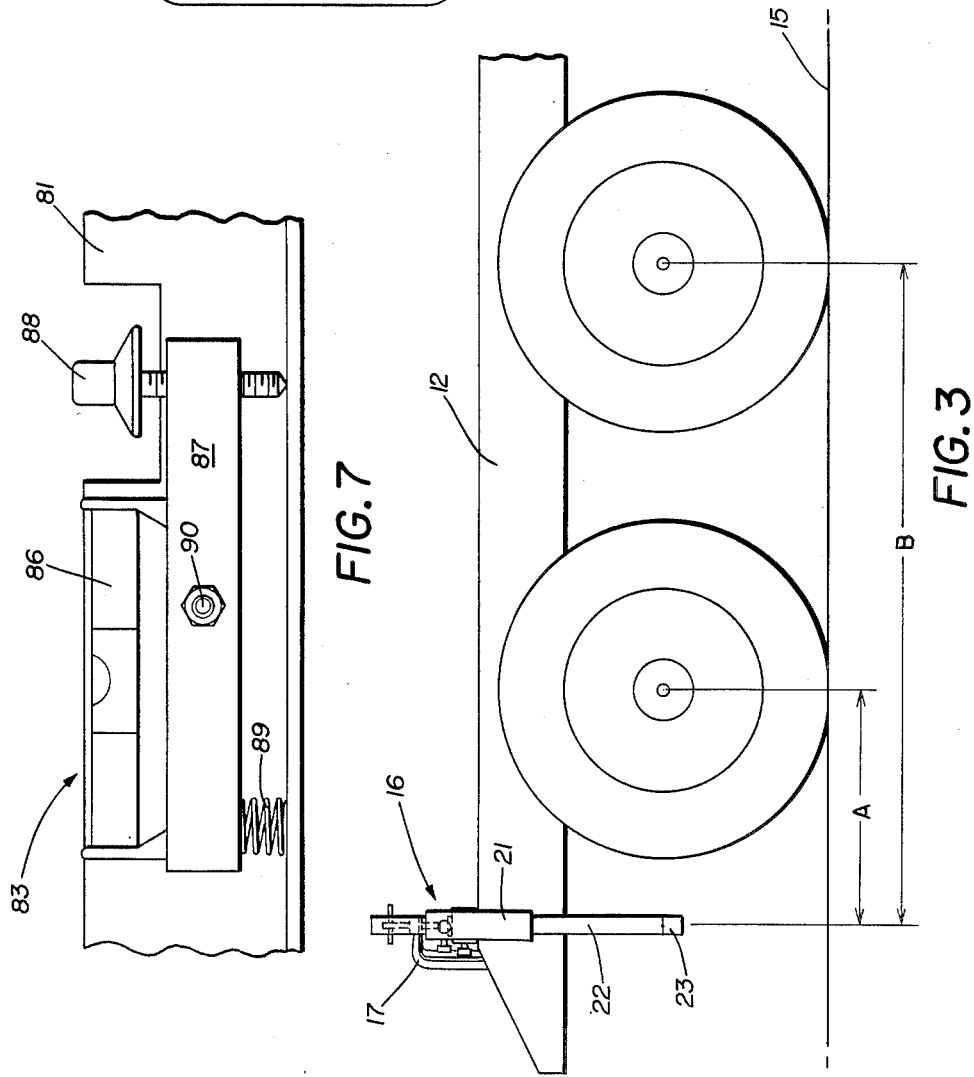
FIG. 7
FIG. 3

VEHICLE ALIGNMENT SYSTEM

BACKGROUND OF THE INVENTION

1. Field of the Invention

This invention relates to an alignment means and more particularly to an alignment means adapted to align vehicle axles and wheels. Specifically, the instant invention relates to an alignment means employing a fixed reference located relative to the frame of a vehicle and a means for establishing the centerline of the axle of the vehicle whereby the distance between the fixed reference point and the centerline of the axle may be measured in order to determine alignment of the axle with respect to the frame. In addition, the camber of the wheels may be determined by using level means.

2. Description of the Prior Art

Alignment means for aligning vehicle wheels are well-known in the art as evidenced by British Pat. No. 778,838 and numerous advertisements found in trade publications such as the *Modern Tire Dealer* at Volume 63, Number 7, June of 1982 at page 3; Volume 63, Number 4, April of 1982 at page 13; Volume 62, Number 2, February of 1981 at page 16; Volume 63, Number 9, August of 1982 at page 31; Volume 63, Number 7, June of 1982 at page 44; Volume 62, Number 4, April of 1981 at page 34; Volume 63, Number 11, September of 1982 at page 10; Volume 62, Number 8, July of 1981 at page 6; Volume 63, Number 8, July of 1982 at page 43.

These prior art devices typically utilize a wheel clamp affixed to the wheel of a vehicle, said wheel clamp having sensors which are utilized to determine the orientation of the wheel and thus the alignment of the wheel/tire combination.

The apparatus employed by the prior art is typically intended to be used in a truck repair facility and conventionally employs rather sophisticated equipment and specialized devices in order to align vehicle wheels.

It has been recognized, as shown in the *Modern Tire Dealer*, Volume 63, Number 7, June of 1982 at page 31, that alignment of the drive axles of trucks with respect to their frame members is extremely important. Rear axle misalignment can create side forces resulting in uneven wear on the steering axle tires as well as drive axle tires.

The two most common faults are drive axles that are not perpendicular to the chassis centerline and drive axles that are not parallel to each other. In either case, drive axle misalignment will not only cause scuffing of the rear tires, but will also put a steady side force on both front tires leading to rapid wear of the front tires. Because this front tire wear resembles toe wear, it is often difficult to pinpoint the actual problem. A typical means for aligning the axles of a truck is found in the *Modern Tire Dealer*, Volume 62, Number 7, June of 1981 at page 55. Generally, the loaded truck is parked on level ground, preferably using the hand brake or trailer brakes to stop so ride heights will be typical. A plump bob string is then taped to the fender of the truck in order that the plumb line is centered over the hub when viewed from the side. A tape measure is then used to measure the distance from the string to the flange at the top of the wheel and is again used to measure the distance from the string to the flange at the bottom of the wheel. The difference in measurements between the measurement at the top of the flange and the measurement at the bottom of the flange provides an indication of the camber of the wheel.

Axle alignment may be checked in a somewhat similar manner by parking the loaded truck on a flat surface. A plumb line is then dropped from the point where each end of each axle meets its spring. A comparable point is used at each axle spring junction. The plumb points are then marked on the ground and the truck is moved. The distance between the points is then measured to determine axle alignment.

It has been found that this method of determining truck alignment is somewhat time consuming and yields results which are not sufficiently accurate. The instant invention is intended to remedy these problems by providing a means for quickly determining the alignment of a vehicle to a reasonable degree of accuracy.

SUMMARY OF THE INVENTION

The present invention relates to a means for aligning axles with respect to the frame of the vehicle and for determining wheel camber.

BRIEF DESCRIPTION OF THE DRAWINGS

FIG. 2 is a plan view of a vehicle schematically representing axle position which discloses the manner in which the instant invention is employed.

FIG. 3 is a side view of the rear portion of a vehicle as disclosed in FIG. 1 of the drawings.

FIG. 4 is a cross-sectional view of the reference bar utilized by the instant invention, showing the details of construction thereof.

FIG. 7 is an enlarged detail of the camber attachment disclosed in FIG. 6 of the drawings, showing the details of construction thereof.

DESCRIPTION OF AN EXEMPLARY EMBODIMENT

Figure 1:
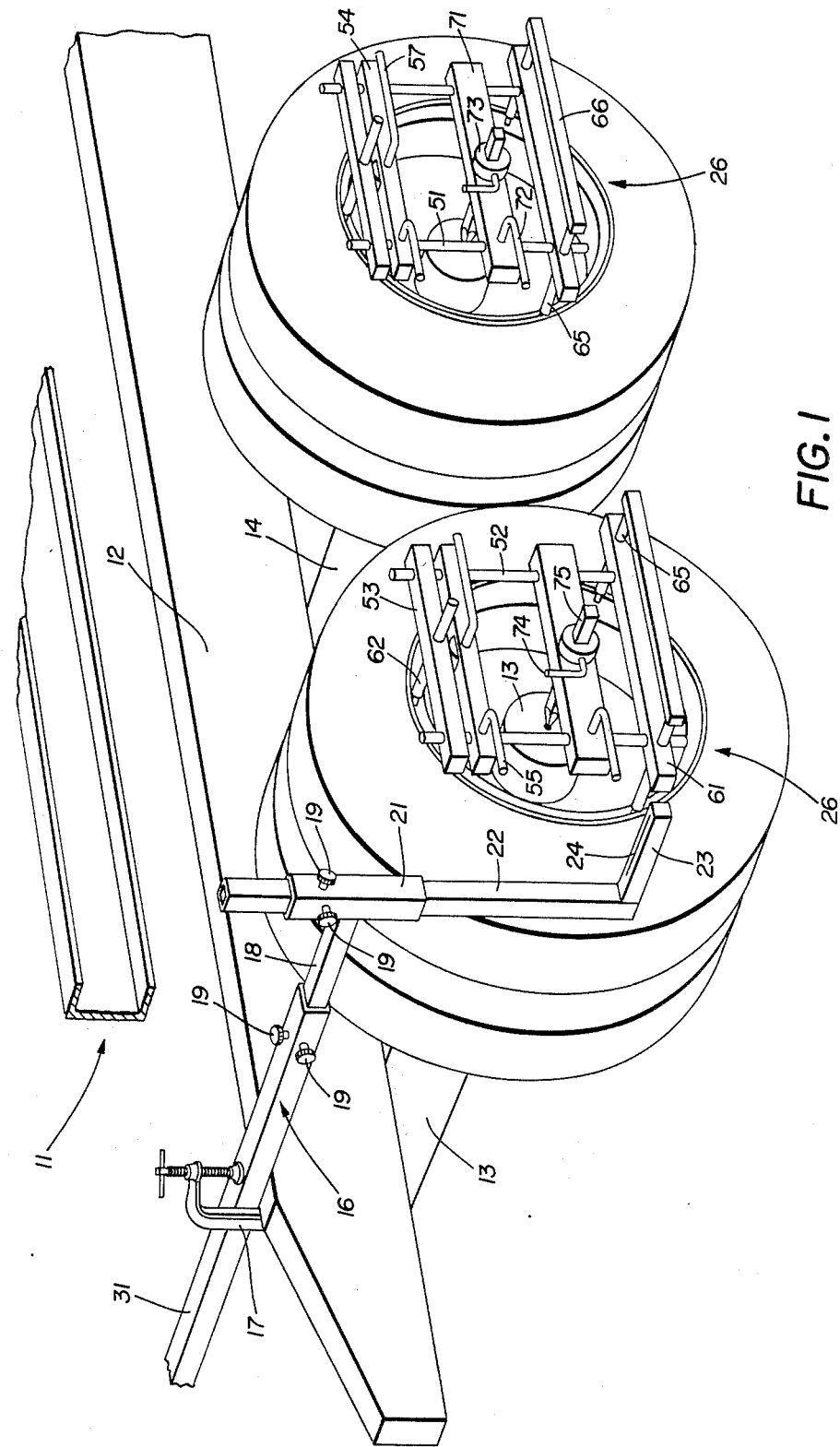
FIG. 1 is a simplified perspective view of the drive wheels of a vehicle showing the manner in which the instant invention is employed.

FIG. 1 of the drawings schematically discloses the rear portion of a conventional truck tractor 11 having frame members 12 to which are mounted drive axles 13 and 14. It should be appreciated that although the exemplary embodiment is described in connection with a truck tractor, it would be obvious to one skilled in the art that the instant invention may also be employed with other vehicles requiring alignment, including, but not limited to automobiles, tractors, trailers, etc.

A conventional truck tractor 11 generally comprises two parallel frame members designated 12 to which are affixed the axles supporting the frame members. The frame members 12 are generally fabricated using jigs and fixtures with the result that the frame members 12 are parallel to each other. The axles 13 and 14 are typically mounted to the frame members 12 via spring means not shown in FIG. 1 for clarity. The axles and their associated suspension means are conventionally mounted on the frame members 12 by a manual operation without the use of either jigs or fixtures oftentimes resulting in inaccuracy in the mounting of the axles to the frame members. This inaccuracy in mounting can result in either a situation wherein the rear drive axle of the truck is not perpendicular to the frame members of the truck or alternatively, in a tandem axle truck tractor, the situation wherein the rear drive axles of the truck tractor are not parallel to each other. Both situations result in scuffing of the rear axle tires and cause additional wear to the front steering tires.

The instant invention is comprised of two main components. The first component is the reference bar assembly 16 which provides a reference relating to the orientation of the frame members 12. Specifically, the reference bar assembly 16 provides a reference line extended from the frame members 12 and perpendicular thereto from which measurements may be taken to the perpendicular line.

The second major component of the instant invention is the wheel assembly 26 which is adapted to be mounted to the rim of a vehicle wheel. The wheel assembly 26 generally provides an extension of the outer edge of the rim of the wheel and has means for allowing the extension of the centerline of the axle having the wheel to which the wheel assembly 26 is mounted.

Referring now to FIG. 2 of the drawings, there is disclosed a schematic plan view of a conventional truck tractor 11 having frame members 12 upon which are mounted rear drive axles 13 and 14 and front axle 20, all having wheels affixed thereto.

Mounted on the rear portion of the frame members 12 is reference bar 16. Associated with each of the outer wheels of the axles 13, 14 and 20 is a bar schematically representing the wheel assembly 26.

It is one of the objects of the instant invention to determine if the axes of the axles 13, 14 and 20 are perpendicular with respect to the frame members 12. Accordingly, the reference bar assembly 16 is temporarily affixed to the frame members 12 by clamp means. The reference bar assembly 16 is mounted on the frame members 12 utilizing conventional square means in order that the reference bar assembly 16 may be mounted perpendicular to the frame members 12. The wheel assemblies 26 provide a means for extending the centerline of the axis of the axles 13, 14 and 20. It may thus be appreciated that there are provided means for determining alignment of the axles 13, 14 and 20 with respect to the frame members 12 by measuring from a fixed point on the reference bar assembly to the centerline of the axles on one side thereof and taking a corresponding measurement on the opposite side of the frame members 12 from the reference bar assembly 16 to the centerline of the axles.

Thus, by taking the measurements and comparing the measurements A and A', it can be determined whether or not the drive axle 13 is perpendicularly oriented with respect to the frame members 12. Similarly, the orientation of the drive axle 14 and the front axle 20 may also be determined by comparing measurements B and B' and C and C' respectively.

Referring now to FIG. 1 of the drawings, there are disclosed the details of construction of the reference bar assembly 16. The reference bar assembly 16 is comprised of a support bar 31 which, in the exemplary embodiment, is made from square seamless tubing preferably of a corrosion-resistant material or having a corrosion-resistant coating thereon. The support bar 31 is temporarily affixed to the frame members 12 by means of reference bar clamps 17. A conventional square is utilized during the mounting of the support bar 31 to the frame members 12 in order to insure that the support bar 31 is perpendicular to the frame members 12. The support bar 31 is adapted to extend beyond the frame members 12 on both sides of the truck tractor 11 slightly short of the first inside wheel of the truck tractor 11. Although the reference bar assembly is shown mounted on the rear of the tractor 11, the assembly may be mounted on any convenient place on the frame members 12.

Disposed in each end of the support bar 31 is telescoping member 18. In the exemplary embodiment the telescoping member 18 is comprised of a square tubing member adapted to be slidably moved within the support bar 31. Fixedly attached to the outboard end of the telescoping member 18 is vertical member 21.

Clamp assemblies 19 are utilized to retain the telescoping member 18 in a fixed positional relationship with respect to the support bar 31. The clamp assemblies 19, as more fully disclosed in FIG. 4 of the drawings, are adapted to frictionally engage the telescoping member 18 by manual rotation of the knurled head 43 of the thread member 42 causing the thread member to be displaced inward of the threaded tab 41 and support bar 31 causing an engagement of the telescoping member 18 between the inner surface of the support bar 31 and the inner end of the thread member 42.

It should be noted that two clamp assemblies 19 are used on adjacent surfaces of the support bar 31 in order to cause the telescoping member 18 to be nested in a corner of the inside of the square tubing which comprises the support bar 31. This inside corner of the support bar 31 and its adjacent inner surfaces provides a reference surface from which the telescoping member 18 may be positioned due to the orthogonal relationship of the clamp assemblies 19 causing the telescoping member 18 to be disposed proximate to these surfaces. The resulting relationship of the telescoping member with respect to the support bar 31 provides a relatively accurate means for positioning the telescoping member 18 with respect to the support bar 31 which means for positioning are readily repeatable and tend to negate the clearances and manufacturing errors of the square tubing which comprise the support bar 31 and the telescoping member 18.

The telescoping member 18 has fixedly attached to the outboard end thereof vertical member 21. The vertical member 21 is comprised of a square tubing member preferably of a non-corrosive material or having a corrosion-resistant coating applied thereto. The vertical member 21 is perpendicularly mounted with respect to the telescoping member 18 and is adapted to slidably receive measuring member 22 which may be positioned relative to the vertical member 21 and fixed relative thereto by clamp assemblies 19 which are employed and embody the same features as discussed above. The measuring member 22 is preferably comprised of square tubing, preferably of a non-corrosive material or having a corrosion-resistant coating applied thereto.

Fixedly attached to the lower end of the measuring member 22 is horizontal element 23. The horizontal element 23 is perpendicular to the measuring member 22 and adapted to be substantially parallel to the telescoping member 18.

Scribed upon the horizontal element 23 is a line 24 which is scribed on the horizontal element 23 substantially parallel to the axis thereof in such a manner as to be parallel to the support bar 31 when the telescoping member 18 is clamped to the support bar 31 and the measuring member 22 is clamped to the vertical member 21. It should be noted that during the scribing of the line 24 upon the horizontal element 23, it is preferable that the line 24 be parallel to the support bar 31 as opposed to being parallel to the horizontal element 23 for reasons which will become more fully apparent below.

It may now be appreciated that there has been provided a means for extending a reference line perpendicular to the frame members 12 outward from the frame members past the outer edge of the drive tires and further, there has been provided means for lowering this reference line to a position at approximately the height of the axles 13, 14 and 20. The reference line so transposed provides a reference line from which measurements may be taken as more fully described below.

Figure 5:
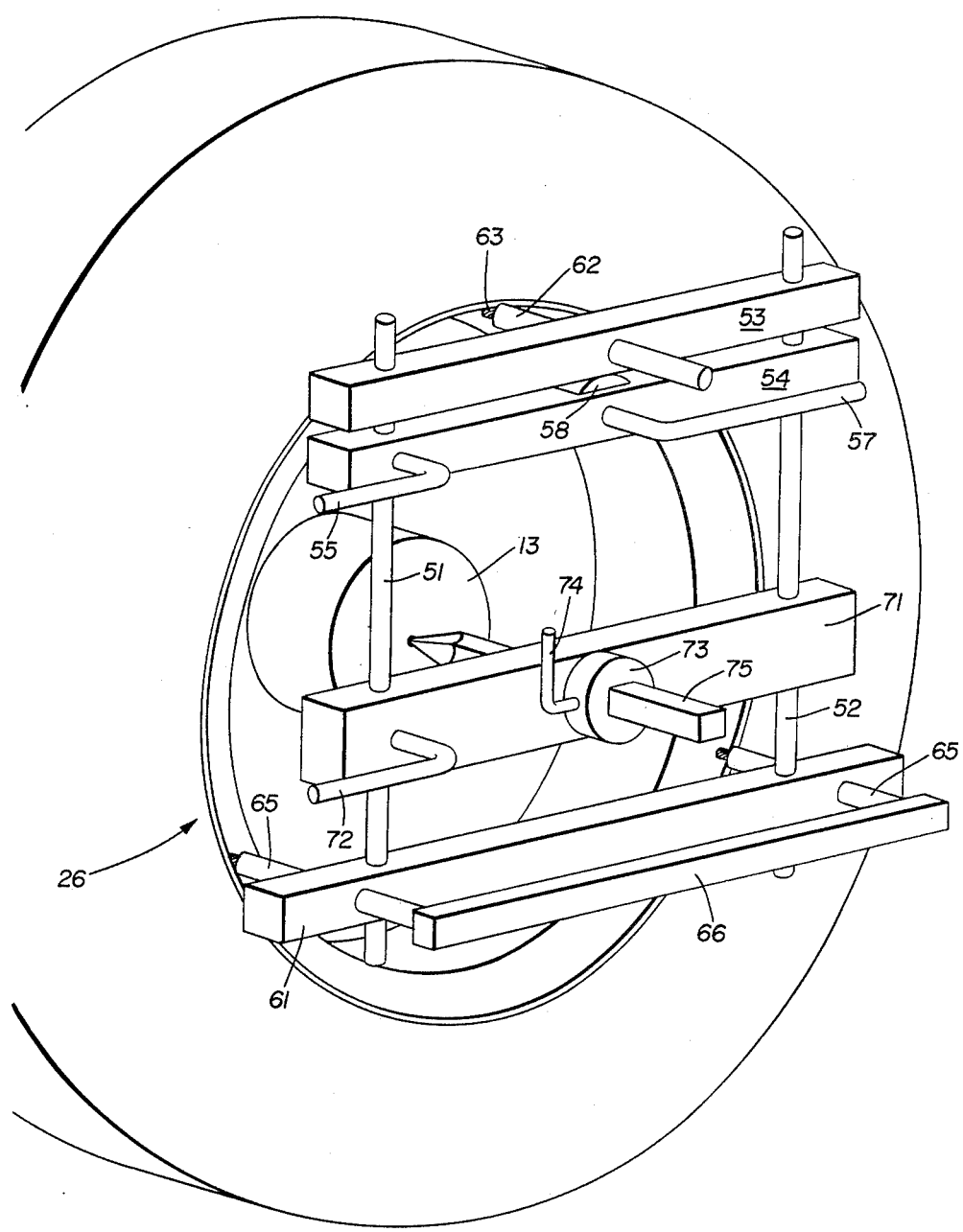
FIG. 5 is a perspective view of the wheel clamp employed by the instant invention.
Figure 6:
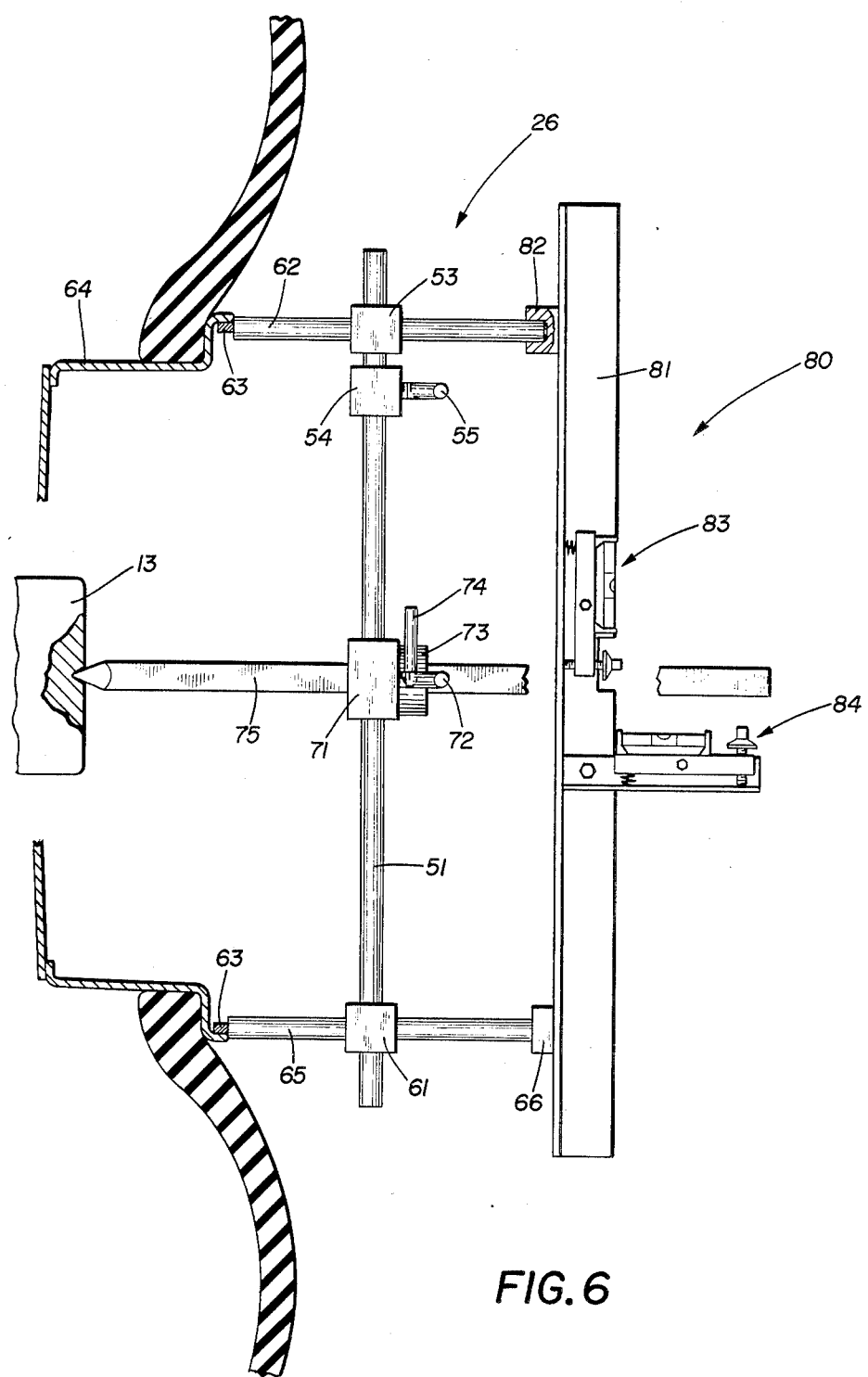
FIG. 6 is a side view of the wheel clamp disclosed in FIG. 5 having the camber attachment affixed thereto.

Referring now to FIGS. 5 and 6 of the drawings, there are shown further details of construction of the wheel assembly 26 employed by the instant invention. The wheel assembly 26 is adapted to be temporarily affixed to the outer edge of the rims of the outboard wheels affixed to the axles 13, 14 and 20 in order to provide a means for measuring the orientation of the rim with respect to the ground 15 as more fully disclosed below and additionally providing a means for providing a reference related to the axis of the axles 13, 14 and 20.

The wheel assembly 26 is comprised of two frame members 51 and 52 which include two parallel rod members secured by cross member means. Disposed on the frame members 51 and 52 at one end thereof is cross member 53, which member has two orifices therein for receipt of frame members 51 and 52. The cross member 53 is adapted to slidably engage the frame members 51 and 52 in order to provide a means for moving said cross member parallel to the longitudinal axis of the frame members 51 and 52.

Disposed proximate to the cross-member 53 is lower support member 54 which also has two orifices therein for engaging said frame members 51 and 52 in order to provide a slidable movement of the lower support member 54 along the frame members 51 and 52. In addition, the lower support member 54 has locking means 55. The locking means 55 is comprised of an angled rod-shaped member having one end thereof threaded in order to engage a similarly threaded hole in the lower support member 54 in proximity to the frame member 51 in order to provide a frictional engagement of the locking means 55 with respect to the frame member 51 upon rotation of the locking means 55. The locking means 55 thus provides a means for fixing the position of the lower support member 54 with respect to the frame members 51 and 52.

Disposed between the frame members 51 and 52 on the lower support member 54 is cam lever 57 which is affixed to and adapted to provide angular movement of the cam member 58 associated with the lower support member 54 and generally disposed between the lower support member 54 and the cross member 53. The cam lever 57 and its associated cam member 58 are employed to provide a locking mechanism for securing the wheel assembly 26 to the rim 64 as more fully disclosed below.

Centrally disposed within the cross member 53 is upper extension member 62. The upper extension member 62 is fixedly attached to the cross member 53 and has one end thereof threaded in order to receive threaded member 63 as more clearly shown in FIG. 6 of the drawings. The threaded member 63, which is of a substantially smaller diameter than the upper extension member 62, is used in conjunction with the end of the extension member 62 to provide a corner contact with the inside edge of rim 64. Specifically, the end of the upper extension member 62 is adapted to contact the outer edge of the rim 64 while the threaded member 63 is adapted to simultaneously engage the inner edge of the rim 64. The threads of the threaded member 63 facilitate the engagement of the threaded member 63 with the inner edge of the rim 64. This engagement is utilized to mount the wheel assembly 26 on the rim 64 as more fully described below.

Mounted on the opposite ends of the frame members 51 and 52 is lower cross member 61. The lower cross member 61 is fixedly attached to the frame members 51 and 52. The lower cross members 61 is also adapted to fixedly receive the lower extension members 65 which are mounted on the lower cross member 61 proximate to the ends of the lower cross member 61. As more clearly shown in FIG. 6 of the drawings, the lower extension members 65 have a threaded hole in one end thereof to receive threaded members 63 in a manner and for purposes described above in connection with the upper extension member 62. In addition there is provided a cross bar 66 which is mounted on the outer ends of the lower extension members 65 opposite to the ends having the threaded member 63 associated therewith.

It may now be appreciated by one skilled in the art that there is provided a means for attaching the wheel assembly 26 to the rim of a tire. In operation the wheel assembly 26 is placed on the rim of a wheel in order to engage the threaded members 63 of the lower extension members 65. The lower support member 54 is then adjusted after releasing locking means 55 in order to position the threaded member 63 of the upper extension member 62 to a position wherein the threaded member 63 of the upper extension member 62 at least partially engages the rim 64. The lower support member 54 is then locked in this position by rotating locking means 55. The cross member 53 supporting the upper extension member 62 is then displaced relative to the lower support member 54 by rotation of cam lever 57 causing the cam member 58 to displace the cross member 53 relative to the lower support member 54. This relative displacement of the cross member 53 causes a further engagement of the threaded member 63 of the upper extension member 62 with the rim 64, thereby securely fastening the wheel assembly 26 to the rim 64.

There is thus provided a means for readily affixing the wheel assebmly 26 to the rim of a wheel and similarly removing same from the rim.

Slidably engaging the frame members 51 and 52 is middle cross member 71. The middle cross member 71 has affixed thereto flange 73. The flange 73 has a square hole therein which extends through the middle cross member 71 and is adapted to receive axle reference bar 75. The axle reference bar 75 has a generally square cross section and has one end thereof pointed to facilitate receipt by the end of the axle 13. The ends of vehicle axles conventionally have a conical-shaped depression in the ends thereof centered about the central axis of the axle as a result of the manufacturing processes employed to manufacture the axle. The axle reference bar is adapted to have the pointed end thereof coact and be received by the conical depression in the end of the axles to position one end of the axle reference bar 75 substantially coincident with the centerline of the axle 13.

Flange locking member 74 which is comprised of an angularly shaped rod member having one end thereof threaded in order to be received by a similarly threaded hole in the flange 73 is utilized to frictionally engage the axle reference bar 75 and temporarily restrict movement of the axle reference bar 75 with respect to the middle cross member 71.

The middle cross member 71 may be temporarily affixed at a position on the frame members 51 and 52 by middle cross member lock 72 which is similar in construction to the locking means 55 discussed above.

In operation, after the wheel assembly 26 has been affixed to the rim 64, the middle cross member 71 is positioned by the operator to a location wherein the centerline of the axle 13 is substantially coincident with the center of the square hole in the flange 73 and the middle cross member 71 is then locked in this position by rotation of the middle cross member lock 72. The axle reference bar 75 is then inserted into the square hole in the flange 73 and the middle cross member 71 in order to cause the pointed end thereof to engage the conical depression in the end of the axle 13. The axle reference bar 75 is then locked in position by rotating the flange locking member 74.

It may thus be appreciated that there is provided a reference member extending outward from the axle 13 that is substantially coincident with the axis of the axle 13. Specifically, it should be noted that since the pointed end of the axle reference bar 75 engages the conical depression in the center of the end of the axle 13 and the axle reference bar 75 is supported by the middle cross member 71 at a position substantially coincident with the centerline of the axle 13, the axle reference bar 75 will thus provide an extension of the axis of the axle 13 from which measurements may be taken as more fully described below.

It may now be appreciated by one skilled in the art that there have been disclosed means for providing two reference lines from which measurements may be taken in order to determine the alignment of the drive axles 13, 14 and 20 with respect to the frame members 12. Specifically, it may be appreciated that a measurement may be taken from the axle reference bar 75 mounted on a wheel assembly 26 mounted on each side of an axle to the scribed line 24 of the reference bar assembly 16. As will be more readily understood by referring to FIG. 2 of the drawings, any deviation in the measurements taken at A and A' will indicate a misalignment of the drive axle 13 with respect to the frame members 12. Similar measurements may be taken with respect to axles 14 and 20 in order to check the alignment of these axles.

During a typical measuring operation, a conventional tape measure is employed to measure the distance from a fixed point on the reference bar 75 to the scribed line 24 on the reference bar assembly 16. Conventionally the end of the tape measured would be engaged with the upper edge of the reference bar 75 mounted on the wheel assembly 26 and the tape extended to the horizontal element 23 of the reference bar assembly 16 in order to make a measurement of the distance between the edge of the reference bar 75 and the scribed line 24 on the horizontal element 23. Although the end of the tape measure is not at the precise center of the axis of the drive axle 13, it may be appreciated that it is the relative measurement that determines alignment and not the absolute measurements thereof.

There has thus been disclosed an apparatus and method for determining the alignment of axles of a vehicle with respect to frame members thereof by utilizing a reference fixed relative to the frame members and a second reference coinciding with the axis of the axles in order to allow the measurement on each side of the vehicle of the distance from the axis of the axles to the fixed reference relative to the frame in order to provide a measurement of the difference between the fixed reference relative to the frame and the axis of the axle.

The instant invention can also be utilized to measure the camber angle of the wheels. The level assembly 80 may be used in conjunction with the wheel assembly 26 in order to determine the camber angle of the wheel.

The level assembly 80 as disclosed in FIG. 6 of the drawings is comprised of a frame 81 which is adapted to be used in conjunction with the wheel assembly 26 by means of mounting member 82 which has a generally cylindrically shaped recess therein adapted to receive the outer end of the upper extension member 62. The lower end of the frame 81 is adapted to rest against the cross bar 66. It should be noted that the upper extension member 62 and the lower extension members 65 are of equal length and that the thickness of the cross bar 66 corresponds to the thickness of the bottom of the mounting member 82. Thus the axis of the frame member 81 is parallel to the plane formed by the outer edge of the rim 64 thereby providing a means for readily measuring the angled orientation of the frame 81 and hence the angled orientation of the rim 64 which in turn corresponds to the camber of the wheel.

The frame 81 rests on the end of the upper extension member 62 by means of mounting member 82. There is, therefore, a tendency for the frame 81 to assume a vertical position relative to the ground with respect to a plane parallel to a plane containing the edge of the rim 64.

The frame 81 when mounted on the upper extension member 62 and resting against the cross bar 66 will assume a camber angle identical to that of the edge of the rim 64. This camber angle is then read using the level assembly 84.

The details of a typical level assembly are disclosed in FIG. 7 of the drawings. The level assembly disclosed in FIG. 7 of the drawing corresponds to level assembly 83 shown in FIG. 6 of the drawings. The level assembly 83 is pivotally affixed to the frame 81 by means of a pivot mount 90 which is comprised of a nut, bolt and washer combination allowing the level frame 87 to pivot about the pivot mount 90. Fixedly attached to the level frame 87 is level vial 86 having an air bubble therein which is utilized to indicate the level condition of the level vial 86 and its associated level frame 87.

Disposed proximate to one end of the level frame 87 between the level frame 87 and the frame 81 is spring 89 which is utilized to spring bias the level frame 87 about the pivot mount 90. Located proximate to the opposite end of the level frame 87 is adjusting screw 88 which engages threads within the level frame 87 and extends therethrough.

It may be readily appreciated that the level frame 87 may be rotated about the pivot mount 90 by means of adjusting screw 88 by rotating the adjusting screw and causing a relative displacement of the adjusting screw with respect to the level frame 87 wherein the spring 89 causes the end of the adjusting screw 88 to maintain contact with the frame 81 thus resulting in an angular displacement of the level frame 87 about the pivot mount 90. In the exemplary embodiment an adjusting screw 88 is employed such that one full revolution of the adjusting screw 88 corresponds to a one degree of rotation of the level frame 87 about the pivot mount 90.

The top of the adjusting screw 88 is provided with gradations which allow the level frame 87 to be accurately displaced within a fraction of one degree.

It may now be readily appreciated by one skilled in the art that the camber of the wheel 64 with respect to the ground 15 may be determined by mounting the frame 81 on the upper extension member 82 and allowing the frame 81 to assume a substantially vertical position and resting against cross bar 66. The level assembly 84 is then adjusted to provide a level condition of the level assembly 84 with the angular displacement required to produce such a level condition corresponding to the camber of the rim 64. It should be noted that the camber of the rim 64 is measured relative to the ground 15. If the ground 15 is not perfectly level, the measurement of the camber will be affected. Accordingly, the slope of the ground 15 is determined by placing the frame 81 on the ground in a position parallel to the axis of the axle and measuring, using level assembly 83, the inclination of the ground 15. This inclination is used to correct the camber measured by the level assembly 84 to determine the actual camber of the rim 64.

It will be apparent to those skilled in the art that various modifications and additions may be made in the instant invention without departing from the essential features thereof, which are intended to be defined and secured by the appended claims.

What is claimed is:

1. A method for determining alignment of a vehicle axle having a first and second end with respect to a longitudinal frame member of said vehicle comprising the steps of:
    (a) measuring a first distance from a point related to the centerline of said first end of said axle to a reference line perpendicular to said frame member and generally parallel to said centerline of said first end of said axle using a reference bar assembly affixed to said longitudinal frame member with clamping means, said reference bar assembly comprising a support bar having at least one telescoping member which may telescopically engage each end of said support bar wherein said telescoping member has mounted on one end thereof vertical bar mounting means adapted to slidably engage a vertical bar having an axis substantially perpendicular to said reference bar assembly wherein said vertical bar has affixed thereto a horizontal element having an axis parallel to said reference bar and having a measuring mark thereon;
    (b) measuring a second distance from a point related to the centerline of said second end of said axle to said reference line perpendicular to said frame member; and
    (c) comparing the measurements of said first and second distance.

2. The method of claim 1 wherein a tape measure is employed to measure said first and second distances.

3. The method of claim 1 wherein said reference line perpendicular to said frame member is disposed at approximately the same height as the centerline of said axle.

4. A method for determining the alignment of a vehicle axle having a wheel mounted on each end thereof with respect to a longitudinal vehicle frame member comprising the steps of:
    (a) affixing a first reference member perpendicular to said longitudinal vehicle frame member using a reference bar assembly affixed to said longitudinal frame member with clamping means, said reference bar assembly comprising a support bar having at least one telescoping member which may telescopically engage each end of said support bar wherein said telescoping member has mounted on one end thereof vertical bar mounting means adapted to slidably engage a vertical bar having an axis substantially perpendicular to said reference bar assembly wherein said vertical bar has affixed thereto a horizontal element having an axis parallel to said reference bar and having a measuring mark thereon;
    (b) affixing a second reference member to a first one of said wheels;
    (c) measuring the distance from a point on said first reference member to a point on said second reference member;
    (d) affixing a second reference member to a second one of said wheels;
    (e) measuring the distance from a point on said first reference member to a point on said second reference member on said second one of said wheels; and
    (f) comparing the distance from said first measurement with the distance from said second measurement.

5. The method of claim 4 wherein said second reference member frictionally engages an edge of said wheel.

6. An apparatus for determining the alignment of a vehicle axle of a vehicle having at least one wheel on an axle comprising:
    (a) a first reference means adapted to be fixedly attached perpendicular to a longitudinal frame member of said vehicle comprising using a reference bar assembly affixed to said longitudinal frame member with clamping means, said reference bar assembly comprising a support bar having at least one telescoping member which may telescopically engage each end of said support bar wherein said telescoping member had mounted on one end thereof vertical bar mounting means adapted to slidably engage a vertical bar having an axis substantially perpendicular to said reference bar assembly wherein said vertical bar has affixed thereto a horizontal element having an axis parallel to said reference bar and having a measuring mark thereon;
    (b) a second reference means adapted to be fixedly attached to said wheel parallel to said axle; and
    (c) measuring means adapted to measure the distance between a point on said first reference means to a point on said second reference means.

* * * * *